(12) United States Patent
Katsuyama et al.

(10) Patent No.: US 10,757,343 B2
(45) Date of Patent: Aug. 25, 2020

(54) CAPTURED IMAGE DISPLAY SYSTEM, ELECTRONIC MIRROR SYSTEM, AND CAPTURED IMAGE DISPLAY METHOD

(71) Applicant: ALPINE ELECTRONICS, INC., Tokyo (JP)

(72) Inventors: Yoshihiro Katsuyama, Iwaki (JP); Hideki Sakamoto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 64 days.

(21) Appl. No.: 16/176,122

(22) Filed: Oct. 31, 2018

(65) Prior Publication Data

US 2019/0149712 A1 May 16, 2019

(30) Foreign Application Priority Data

Nov. 13, 2017 (JP) .................. 2017-218295

(51) Int. Cl.
*H04N 5/235* (2006.01)
*H04N 5/265* (2006.01)
(Continued)

(52) U.S. Cl.
CPC .............. *H04N 5/2355* (2013.01); *B60R 1/00* (2013.01); *G06K 9/00825* (2013.01); *H04N 5/2351* (2013.01); *H04N 5/2352* (2013.01); *H04N 5/2353* (2013.01); *H04N 5/2356* (2013.01); *H04N 5/265* (2013.01); *B60R 2300/30* (2013.01); *B60R 2300/303* (2013.01); *B60R 2300/80* (2013.01)

(58) Field of Classification Search
CPC .......................... B60Q 2300/45; H04N 5/2351
See application file for complete search history.

(56) References Cited

U.S. PATENT DOCUMENTS

| 4,703,496 A * | 10/1987 | Meccariello | ............. H04N 5/32 348/E5.086 |
| 2004/0169896 A1 * | 9/2004 | Kondo | ................. H04N 5/3595 358/482 |

(Continued)

FOREIGN PATENT DOCUMENTS

| EP | 1 573 479 A2 | 9/2005 |
| JP | 2006-339994 | 12/2006 |

(Continued)

OTHER PUBLICATIONS

Extended European Search Report dated Feb. 22, 2019 from the corresponding EP Application No. 18203438.9.

*Primary Examiner* — Paulos M Natnael
(74) *Attorney, Agent, or Firm* — Brinks Gilson & Lione

(57) ABSTRACT

When it is possible to capture a plurality of light sources as images of a plurality of separated light sources with a gain within a range for each of the ranges of mutually different gains, images captured with the maximum gains among the gains that enables the capturing as the images of the plurality of light sources, that is, images captured to be the brightest is generated as use images (a, b, and c). Then, an image d, obtained by combining only the use images (a and b) in which the plurality of light sources is successfully captured as the images of the plurality of separated light sources among the generated use images, is displayed on a display.

9 Claims, 4 Drawing Sheets

(51) Int. Cl.
    *B60R 1/00*    (2006.01)
    *G06K 9/00*    (2006.01)

(56)         References Cited

U.S. PATENT DOCUMENTS

2008/0012942 A1*  1/2008  Kawamura .......... H04N 5/2352
                                                    348/164
2008/0240607 A1* 10/2008  Sun ..................... G06T 5/50
                                                    382/275
2013/0027511 A1*  1/2013  Takemura .......... G06K 9/00798
                                                     348/42
2014/0022408 A1   1/2014  Nashizawa
2015/0078661 A1   3/2015  Granados
2019/0191106 A1*  6/2019  Dabral .................. H04N 5/265

FOREIGN PATENT DOCUMENTS

JP          3970903 B2    6/2007
WO       2004/03183 A2    4/2004
WO      2016/194296 A1   12/2016

* cited by examiner

CAPTURED IMAGE DISPLAY SYSTEM, ELECTRONIC MIRROR SYSTEM, AND CAPTURED IMAGE DISPLAY METHOD

RELATED APPLICATIONS

The present application claims priority to Japanese Patent Appln. No. 2017-218295, filed Nov. 13, 2017, the entire disclosure of which is hereby incorporated by reference.

BACKGROUND

1. Field of the Disclosure

The present disclosure relates to a captured image display system that displays an image captured by a camera.

2. Description of the Related Art

As a captured image display system that displays an image captured by a camera, there is known an electronic mirror system in which a display is disposed at a position above a front windshield instead of a room mirror, and an image, captured by a camera capturing images of a rear of an automobile, is displayed on the display (for example, JP 2016-60411 A and JP 2007-214749 A).

In addition, as a technique for the captured image display system, there is known a technique for a system that captures an image including headlights of an automobile. The technique includes reducing a gain of a camera or increasing a shutter speed of the camera when a pixel region whose luminance value is saturated in the image captured by the camera so as to suppress two headlights from appearing as one light source in the captured image due to the saturation (for example, JP 2006-339994 A).

SUMMARY

In implementations of the above-described technique of reducing a gain of a camera or increasing a shutter speed of the camera when a pixel region whose luminance value is saturated in an image captured by the camera, so as to suppress the two headlights from appearing as one light source, the entire image becomes dark. As a result, there occurs a problem that a dark part of a captured region becomes black and is hardly visible in some cases.

Therefore, an objective of the present disclosure is to display an image captured by a camera in a captured image display system that displays the captured image such that a dark part of a captured region is visible in a relatively favorable manner while preventing two light sources from appearing as one light source.

To address the above objective, the present disclosure relates to a captured image display system that displays an image captured by a camera on a display, the captured image display system including: a processor configured to execute instructions stored in a memory and to generate a plurality of display candidate images, which is a plurality of images captured by the camera with mutually different capture setting values while using a gain of the camera as the capture setting value; and display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other.

Here, in such a captured image display system, an exposure time of the camera may be set as the capture setting value instead of the gain of the camera. Alternatively, "the camera gain×the camera exposure time" may be set as the capture setting value instead of the gain of the camera.

According to such a captured image display system, it is possible to combine only the images in which the plurality of light sources appears as the images of the plurality of separated light sources among the images captured by the camera by varying the camera gain, the camera exposure time, or the camera gain×the camera exposure time and display the combined image, and thus, it is possible to display an image with a wide dynamic range that is visible in a relatively favorable manner even for a dark part of a captured region while preventing two light sources from appearing as one continuous high-luminance image.

Here, such a captured image display system may be configured such that the processor is configured to search a maximum capture setting value, which enables the camera to capture the plurality of light sources as the images of the plurality of separated light sources among capture setting values within a range, for each of preset ranges of a plurality of mutually different capture setting values, and an image captured by the camera with the maximum capture setting value is used as the display candidate image if the maximum capture setting value is successfully searched.

In this manner, when it is possible to capture a display candidate image in which the plurality of light sources appears as the images of the plurality of separated light sources for each of the ranges of the plurality of capture setting value, it is possible to generate an image as bright as possible as the display candidate image and to improve the visibility of a display image.

In addition, the above captured image display system may be configured such that the processor is configured to extract a high-luminance region, included in an image captured by the camera with the maximum capture setting value among the capture setting values included in the range of the plurality of capture setting values, as a target high-luminance region, and searches a maximum capture setting value with which the target high-luminance region can be separated into a plurality of separated high-luminance regions among the capture setting values within the range as the maximum capture setting value that enables the camera to capture the plurality of light sources as the images of the plurality of separated light sources, for each of the preset ranges of the plurality of mutually different capture setting values.

In addition, the above captured image display system may be configured such that a combined image, obtained by combining only a plurality of display candidate images appearing as the images of the plurality of light sources with a combining process including high-dynamic-range rendering, is displayed on the display.

In addition, implementations of the present disclosure provide an electronic mirror system including the captured image display system. Here, in the electronic mirror system, the camera is a camera that is mounted in an automobile to capture the rear, left rear or right rear of the automobile, and the display is disposed at a position visible by a driver of the automobile.

As described above, according to implementations of the present disclosure, it is possible to display the image captured by the camera in the captured image display system that displays the image captured by the camera such that the dark part of the captured region is visible in a relatively favorable manner while preventing the two light sources from appearing as one light source.

DETAILED DESCRIPTION OF THE DRAWINGS

Figure 1C:
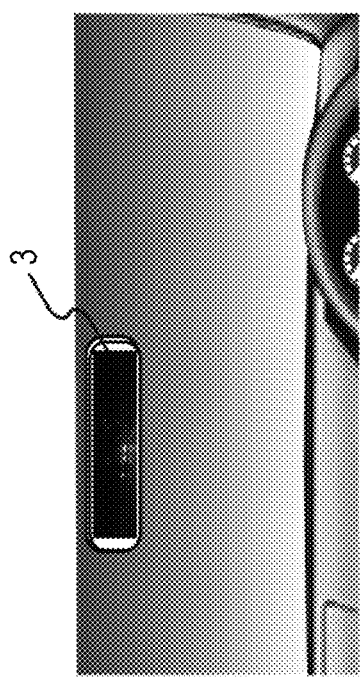
FIGS. 1A to 1C are block diagrams illustrating a configuration of an electronic mirror system.
Figure 1A:

FIG. 1A illustrates a configuration of an electronic mirror system.

The electronic mirror system is a system mounted in an automobile, and includes a camera 1, a display control device 2, and a display 3 as illustrated in the drawing. The display control device 2 may include a microcontroller, central processing unit (CPU), or any other type of hardware processor that is able to read and execute instructions stored in memory and/or stored in another other type storage.

Figure 1B:
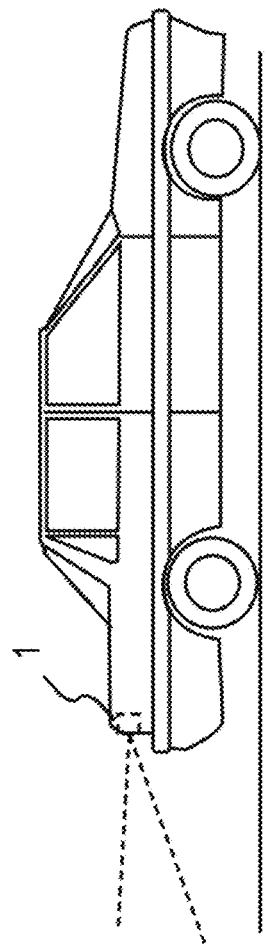

Here, the camera 1 is disposed at the rear of the automobile to capture images of a state of the rear of the automobile, for example, as illustrated in FIG. 1B. In addition, the display 3 is disposed at a position above a front windshield, that is, at a position where a room mirror has conventionally been disposed with its display surface facing rearward as illustrated in FIG. 1C.

Next, a nighttime display process that is performed by the display control device 2 at night in such an electronic mirror system will be described. Incidentally, whether it is currently at night may be detected based on an overall luminance of an image captured by the camera 1, illuminance detected by an illuminance sensor, which is additionally provided, an on/off state of a light of the automobile, or the like.

Figure 2:
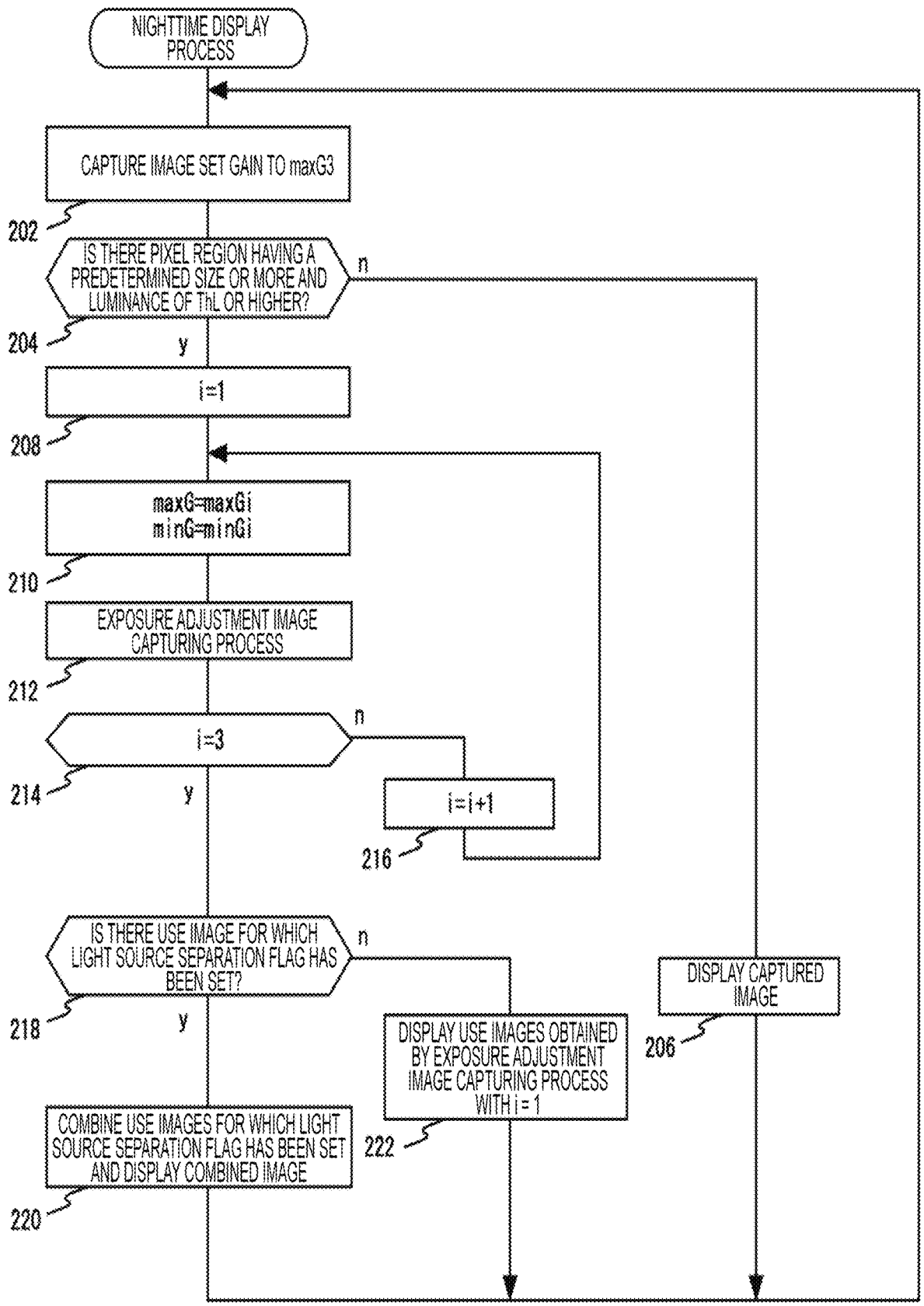
FIG. 2 is a flowchart illustrating a nighttime display process.

FIG. 2 illustrates a procedure of the nighttime display process.

First, constants used in this nighttime display process will be illustrated.

In this nighttime display process, constants of miniG1, maxG1, miniG2, maxG2, miniG3, and maxG3 that satisfy "miniG1<maxG1<miniG2<maxG2<miniG3<maxG3" are used as the constants representing a gain of the camera 1.

As illustrated in the drawing, the display control device 2 first sets the gain of the camera 1 to maxG3 to perform capture of an image in the nighttime display process (Step 202).

Then, it is checked whether there is a high-luminance pixel region having a predetermined size or more and a luminance value of a preset threshold ThL or higher in the captured image (Step 204). Here, the threshold ThL is set to a value close to a saturation value of the luminance or a saturation value less than the saturation value of the luminance. In some implementations, the predetermined size is, for example, a size including two points in a captured image on which the two points separated from each other by 1.3 m at positions separated from the camera 1 by 250 m are reflected.

Then, when there is no pixel region of the threshold ThL or higher (Step 204), the image captured in Step 202 is displayed on the display 3 (Step 206), and the process returns to Step 202.

On the other hand, when there is the pixel region of the threshold ThL or higher (Step 204), the processing in Steps 210 and 212 is performed for each case of i=1, i=2, and i=3 (Steps 208, 214, and 216).

That is, in Step 210, after miniG is set to the constant miniGi and maxG is set to the constant maxGi, an exposure adjustment image capturing process using miniG and maxG is performed in Step 212.

Figure 3:
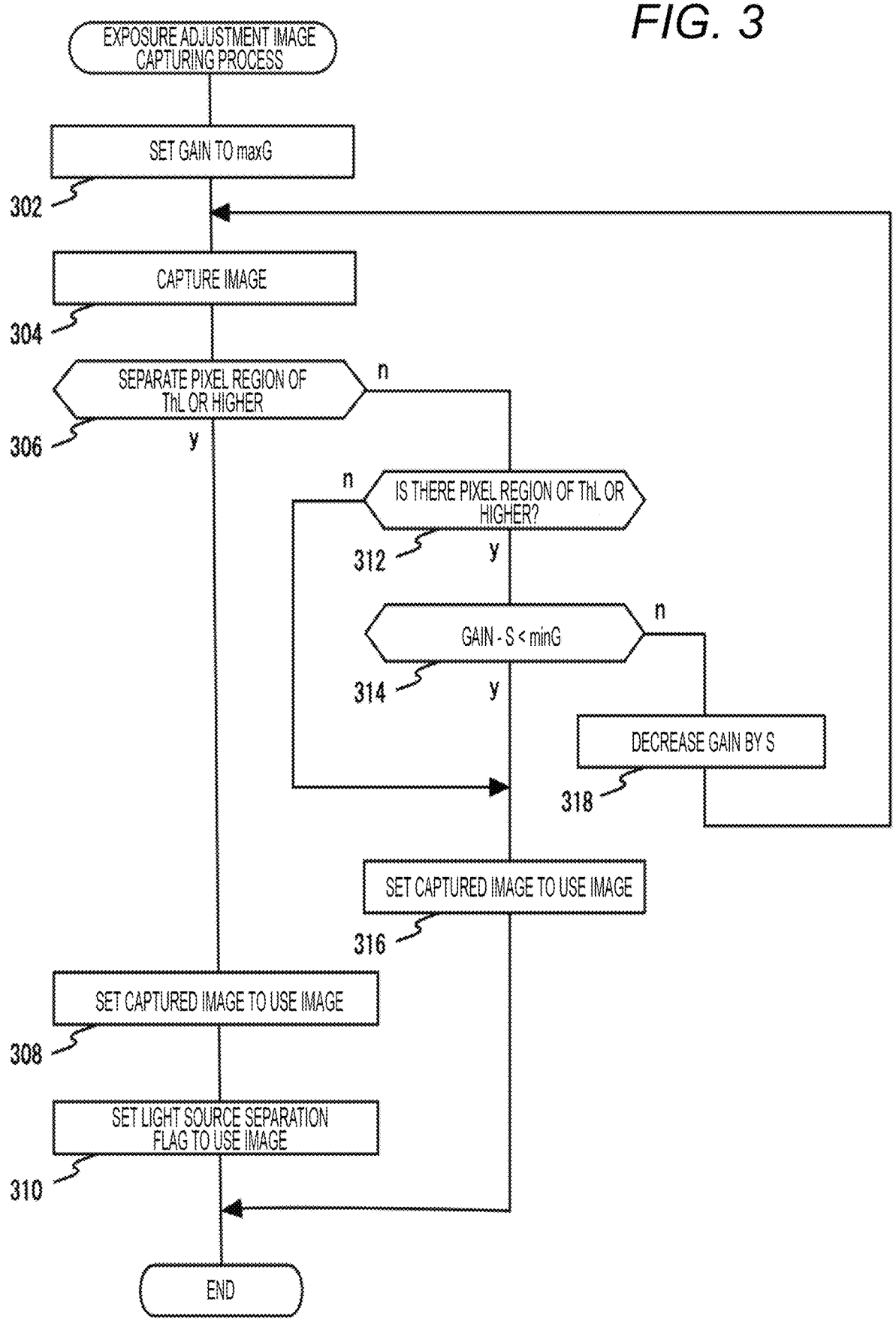
FIG. 3 is a flowchart illustrating an exposure adjustment image capturing process.

Here, FIG. 3 illustrates a procedure of the exposure adjustment image capturing process to be performed in Step 212.

As illustrated in the drawing, first, the display control device 2 sets the gain of the camera 1 to maxG in the exposure adjustment image capturing process (Step 302). Then, the camera 1 captures an image (Step 304).

Then, it is checked whether the high-luminance pixel region of the threshold ThL or higher detected in Step 204 of FIG. 2 is separated into a plurality of pixel regions having a relatively high luminance, divided by a pixel region having relatively low luminance, that is, separated into images of a plurality of light sources in the captured image (Step 306).

Then, when the high-luminance pixel region is not separated into the images of the plurality of light sources (Step 306), it is checked whether a pixel region of ThM or higher remains in the captured image using ThM as a predetermined threshold lower than ThL (Step 312). Further, the image captured in Step 304 is finally set as a use image (Step 316) if there is no remaining pixel region, and the exposure adjustment image capturing process is ended.

On the other hand, if the pixel region of ThM or higher remains in the captured image (Step 312), it is checked whether a value, obtained by subtracting a preset step amount S from the current gain of the camera 1, is less than miniG (Step 314).

Then, when the value obtained by subtracting the preset step amount S from the current gain of the camera 1 is less than miniG (Step 314), the image captured in Step 304 is finally set as a use image (Step 316), and the exposure adjustment image capturing process is ended.

On the other hand, if the value obtained by subtracting the preset step amount S from the current gain of the camera 1 is not less than miniG (Step 314), the gain of the camera 1 is decreased by the Step amount S (Step 318), and the process returns to the processing from Step 304.

Then, when it is determined in Step 306 that the high-luminance pixel region of the threshold ThL or higher has been separated into the images of the plurality of light sources, the image captured in Step 304 is finally set as a use image (Step 308), and then, a light source separation flag is set in the use image (Step 310).

Then, the exposure adjustment image capturing process is ended.

According to implementations of such an exposure adjustment image capturing process, when it is possible to capture the high-luminance pixel region of the threshold ThL or higher detected in Step 204 of FIG. 2 as the images of the plurality of light sources with gains within a range of the gains for each of a range of gains of miniG1 to maxG1, a range of gains of miniG2 to maxG2, and a range of gains of miniG3 to maxG3, an image captured with the maximum gain among the gains with which the capturing as the images of the plurality of light sources is possible is generated as the use image, and the light source separation flag is set in the use image.

In addition, when it is difficult to capture the high-luminance pixel region of the threshold ThL or higher detected in Step 204 of FIG. 2 as the images of the plurality of light sources with the gain within the range of gains for each of the above-described ranges of the gains, an image, captured with a gain that causes the pixel region of ThM or higher not to remain in the captured image in the range of gains or the minimum gain, is generated as a use image, and the light source separation flag is not set in this use image.

Returning to FIG. 2, when the setting of miniG to maxG in Step 210, and the exposure adjustment image capturing process in Step 212 are ended for each case of i=1, i=2, and i=3 (Steps 208, 214, and 216), it is checked whether there is a use image in which the light source separation flag has been set among three use images generated by the exposure adjustment image capturing process performed for each case of i=1, i=2, and i=3 (Step 218).

Then, when there are use images in which the light source separation flag has been set (Step 218), an image, obtained by combining only the use images in which the light source separation flag has been set, with predetermined image processing F is generated and displayed on the display 3 (Step 220), and the process returns to the processing from Step 202. Incidentally, if there is only one use image in which the light source separation flag has been set, this use image is displayed on the display 3 in Step 220.

On the other hand, when there is no use image in which the light source separation flag has been set (Step 218), the use image generated by the exposure adjustment image capturing process performed for i=1 is displayed on the display 3 (Step 222), and the process returns to Step 202.

Implementations of the nighttime display process performed by the display control device 2 have been described as above.

Figure 4D:
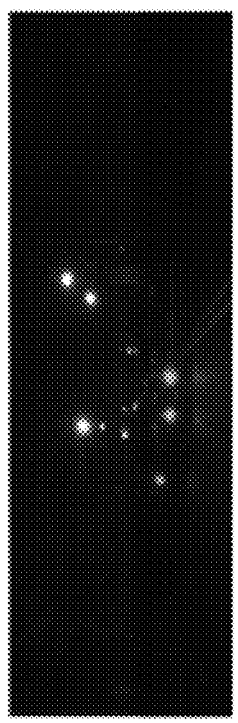
FIGS. 4A to 4D are views illustrating a processing example of the nighttime display process.
Figure 4A:
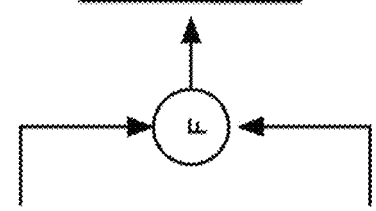
Figure 4A:
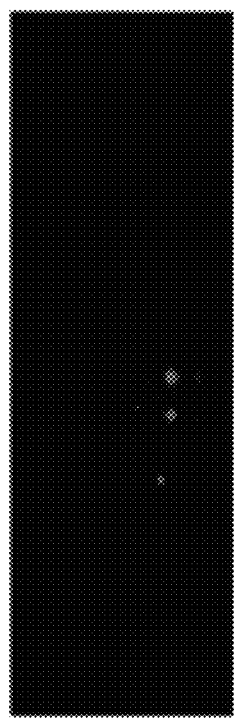
Figure 4B:
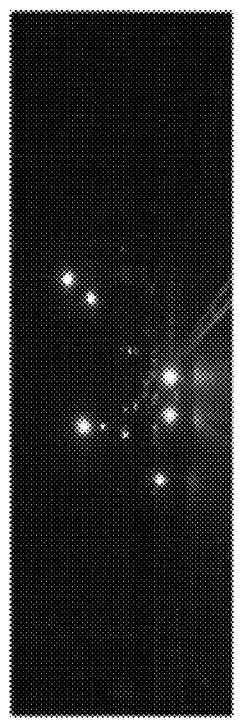
Figure 4C:

Here, FIGS. 4A to 4D illustrate examples of use images generated for the respective ranges of gains when there is a following car at night. FIG. 4A represents the use image generated for the range of gains of miniG1 to maxG1, FIG. 4B represents the use image generated for the range of gains of miniG2 to maxG2, and FIG. 4C represents the use image generated for the range of gains of miniG3 to maxG3.

As illustrated in the drawings, in this example, two headlights of the following car appear to be separated from each other as images of two light sources regarding the use image generated for the range of gains of miniG1 to maxG1 in FIG. 4A and the use image generated for the range of gains of miniG2 to maxG2 in FIG. 4B, but two headlights of the following car appear as an image of one continuous light source due to saturation in the use image generated for the range of gains of miniG3 to maxG3 in FIG. 4C.

Then, according to this nighttime display process, an image illustrated in FIG. 4D, obtained by combining only the use image in FIG. 4A and the use image in FIG. 4B in which the two headlights of the following car appear separately as the images of the two light sources among the three use images generated in this manner with the predetermined image processing F, is displayed on the display 3.

Here, as the image processing F, for example, it is possible to perform high-dynamic-range rendering (HDR) to generate an image with a wider dynamic range than a plurality of images using the plurality of images with different exposures, tone mapping to reduce the dynamic range of the image generated by HDR to a dynamic range of the display 3, and the like.

In addition, another image processing such as averaging and addition can be performed as the image processing F.

Here, when combining is performed to include even the use image in FIG. 4C in which the two headlights of the following car appear as the image of one light source in addition to the use image of FIG. 4A and the use image of FIG. 4B in which the two headlights of the following car appear separately as the images of the two light sources, there is a case where an image to be displayed appears in a state where the two headlights of the following car do not separate as the images of the two light sources or a state whether the headlights are separated or not is unclear.

However, only the use images in which the two headlights of the following car appear separately as the images of the two light sources are combined and displayed on the display 3 in the nighttime display process, and thus, the two headlights of the following car appear to be clearly separated from each other as the images of the two light sources even in an image to be displayed.

In addition, the use image is the image captured with the maximum gain among the gains, which enables the capturing of the two headlights of the following car as the images of the two light sources within each of the gain ranges, and thus, becomes the image as bright as possible.

Therefore, in implementations of the nighttime display process, it is possible to display the image with the wide dynamic range, which provides relatively favorable visibility even for the dark part of the captured region, while preventing the two light sources such as the two headlights from appearing as one light source.

The exposure adjustment image capturing process is performed for the plurality of ranges having different gains of the camera 1 in nighttime display process in implementations described above, but the exposure adjustment image capturing process may be performed for a plurality of ranges having different exposure times (shutter speeds) or different values of "exposure time (shutter speed)×gain" of the camera 1.

That is, the exposure adjustment image capturing process corresponding to each of a plurality of ranges of different exposure times (shutter speeds) of the camera 1 is performed, and an image captured with the longest exposure time among the exposure times that enable capturing is generated as a use image in which the light source separation flag is set when it is possible to capture the high-luminance pixel region of the threshold ThL or higher detected in Step 204 of FIG. 2 as the images of the plurality of light sources with an exposure time within the corresponding range in each of the exposure adjustment image capturing processes. When it is difficult to capture the high-luminance pixel region of the threshold ThL or higher detected in Step 204 of FIG. 2 as the images of the plurality of light sources with the exposure time within the corresponding range, an image captured an exposure time that causes the pixel region of ThM or higher not to remain in captured images in the corresponding range or the minimum exposure time may be generated as a use image in which the light source separation flag is not set.

Alternatively, the exposure adjustment image capturing process corresponding to each of a plurality of ranges of different values of "exposure time (shutter speed)×gain" of the camera 1 is performed, and an image captured with the maximum value of "exposure time×gain" among values of "exposure time×gain" that enable capturing is generated as a use image in which the light source separation flag is set when it is possible to capture the high-luminance pixel region of the threshold ThL or higher detected in Step 204 of FIG. 2 as the images of the plurality of light sources with a value of "exposure time×gain" within the corresponding range in each of the exposure adjustment image capturing processes. When it is difficult to capture the high-luminance pixel region of the threshold ThL or higher detected in Step 204 of FIG. 2 as the images of the plurality of light sources with a value of "exposure time×gain" within the corresponding range, an image captured a value of "exposure time× gain" that causes the pixel region of ThM or higher not to remain in captured images in the corresponding range or the minimum value of "exposure time×gain" may be generated as a use image in which the light source separation flag is not set.

In addition, the above description has been given regarding the electronic mirror system that displays the image captured by the camera 1 on the display 3 disposed at the position above the front windshield, but the above nighttime display process can be similarly applied to any arbitrary captured image display system that captures an image including a light source using the camera 1 and displays the captured image such as an electronic mirror system that displays left rear and right rear images captured by the camera 1 on the displays 3 disposed on the left and right, that is, the electronic mirror system which replaces the conventional side-view mirrors.

It is intended that the foregoing detailed description be regarded as illustrative rather than limiting, and that it be understood that it is the following claims, including all equivalents, that are intended to define the spirit and scope of this disclosure.

What is claimed is:

1. A captured image display system that displays an image captured by a camera on a display, the captured image display system comprising:
 a processor configured to execute instructions stored in a memory and to:
  generate a plurality of display candidate images, which is a plurality of images captured by the camera with mutually different capture setting values while using a gain of the camera as the capture setting value; and
  display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other;
 wherein the processor is further configured to search a maximum capture setting value, which enables the camera to capture the plurality of light sources as the images of the plurality of separated light sources among capture setting values within a range, for each of preset ranges of a plurality of mutually different capture setting values, and an image captured by the camera with the maximum capture setting value is used as the display candidate image if the maximum capture setting value is successfully searched.

2. The captured image display system according to claim 1, wherein the processor is configured to extract a high-luminance region, included in an image captured by the camera with the maximum capture setting value among the capture setting values included in the range of the plurality of capture setting values, as a target high-luminance region, and searches a maximum capture setting value with which the target high-luminance region is separable into a plurality of separated high-luminance regions among the capture setting values within the range as the maximum capture setting value that enables the camera to capture the plurality of light sources as the images of the plurality of separated light sources, for each of the preset ranges of the plurality of mutually different capture setting values.

3. The captured image display system according to claim 1, wherein the processor is configured to display a combined image, obtained by combining only a plurality of display candidate images appearing as the images of the plurality of light sources with a combining process including high-dynamic-range rendering, on the display.

4. A captured image display system that displays an image captured by a camera on a display, the captured image display system comprising:
 a processor configured to execute instructions stored in a memory and to:
  generate a plurality of display candidate images, which is a plurality of images captured by the camera with mutually different capture setting values while using an exposure time of the camera as the capture setting value; and
  display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other;
 wherein the processor is further configured to search a maximum capture setting value, which enables the camera to capture the plurality of light sources as the images of the plurality of separated light sources among capture setting values within a range, for each of preset ranges of a plurality of mutually different capture setting values, and an image captured by the camera with the maximum capture setting value is used as the display candidate image if the maximum capture setting value is successfully searched.

5. A captured image display system that displays an image captured by a camera on a display, the captured image display system comprising:
 a processor configured to execute instructions stored in a memory and to:
  generate a plurality of display candidate images, which is a plurality of images captured by the camera with mutually different capture setting values while using a gain of the camera multiplied by an exposure time of the camera as the capture setting value; and
  display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other;
 wherein the processor is further configured to search a maximum capture setting value, which enables the camera to capture the plurality of light sources as the images of the plurality of separated light sources among capture setting values within a range, for each of preset ranges of a plurality of mutually different capture setting values, and an image captured by the camera with the maximum capture setting value is used as the display candidate image if the maximum capture setting value is successfully searched.

6. An electronic mirror system comprising the captured image display system according to claim 1, wherein
the camera is a camera that is mounted in an automobile to capture rear, left rear or right rear of the automobile, and
the display is disposed at a position visible by a driver of the automobile.

7. A captured image display method for displaying an image captured by a camera on a display in a captured image display system comprising the camera and the display, the captured image display method comprising:
a display candidate image generation step of causing the captured image display system to generate a plurality of display candidate images, which is a plurality of images captured by the camera with mutually different capture setting values while using a gain of the camera as the capture setting value; and
a combined image display step of causing the captured image display system to display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other;
wherein a maximum capturing setting value, which enables the camera to capture the plurality of light sources as the images of the plurality of separated light sources among capture setting values within a range, is searched for each of preset ranges of a plurality of mutually different capture setting values, and an image captured by the camera with the maximum capture setting value is used as the display candidate image if the maximum capture setting value is successfully searched.

8. A captured image display method for displaying an image captured by a camera on a display in a captured image display system comprising the camera and the display, the captured image display method comprising:
a display candidate image generation step of causing the captured image display system to generate a plurality of display candidate images, which is a plurality of images captured by the camera with mutually different capture setting values while using an exposure time of the camera as the capture setting value; and
a combined image display step of causing the captured image display system to display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other;
wherein a maximum capturing setting value, which enables the camera to capture the plurality of light sources as the images of the plurality of separated light sources among capture setting values within a range, is searched for each of preset ranges of a plurality of mutually different capture setting values, and an image captured by the camera with the maximum capture setting value is used as the display candidate image if the maximum capture setting value is successfully searched.

9. A captured image display method for displaying an image captured by a camera on a display in a captured image display system comprising the camera and the display, the captured image display method comprising:
a display candidate image generation step of causing the captured image display system to generate a plurality of display candidate images, which is a plurality of images captured by the camera with mutually different capture setting values while using a gain of the camera multiplied by an exposure time of the camera as the capturing setting value; and
a combined image display step of causing the captured image display system to display a combined image, obtained by combining only a plurality of display candidate images appearing as images of a plurality of light sources, on the display when the plurality of display candidate images includes a display candidate image in which the plurality of light sources appears as a continuous high-luminance image and the plurality of display candidate images in which the plurality of light sources appears as the images of the plurality of light sources separated from each other;
wherein a maximum capturing setting value, which enables the camera to capture the plurality of light sources as the images of the plurality of separated light sources among capture setting values within a range, is searched for each of preset ranges of a plurality of mutually different capture setting values, and an image captured by the camera with the maximum capture setting value is used as the display candidate image if the maximum capture setting value is successfully searched.

* * * * *